United States Patent [19]

Gagas

[11] Patent Number: 4,556,081
[45] Date of Patent: Dec. 3, 1985

[54] BUTTERFLY VALVE ADAPTOR

[76] Inventor: Michael S. Gagas, 5558 N. Shoreland Ave., Milwaukee, Wis. 53217

[21] Appl. No.: 555,192

[22] Filed: Nov. 25, 1983

[51] Int. Cl.⁴ ............................................. F16L 5/00
[52] U.S. Cl. ................................. 137/366; 137/364; 52/20
[58] Field of Search ............... 137/363, 364, 365, 366, 137/367, 368; 52/20

[56] References Cited

U.S. PATENT DOCUMENTS

| | | | |
|---|---|---|---|
| 1,578,885 | 3/1926 | Flinn | 137/366 |
| 2,691,384 | 10/1954 | Mueller et al. | 137/366 |
| 3,730,213 | 5/1973 | Bates | 137/364 |
| 4,331,178 | 5/1982 | Handley et al. | 137/366 |

Primary Examiner—A. Michael Chambers
Attorney, Agent, or Firm—Ronald E. Barry

[57] ABSTRACT

An adaptor for supporting a key box on the valve actuator for an underground water main butterfly valve, the adaptor includes a mounting plate having guides arranged to align the base of the key box on the valve actuator and a stabilizing plate connected to the mounting plate in a spaced relation thereto and being adapted to be positioned below the butterfly to prevent tipping of the mounting plate.

6 Claims, 5 Drawing Figures

BUTTERFLY VALVE ADAPTOR

THE BACKGROUND OF THE INVENTION

Butterfly valves for underground water mains are operated from the surface of the ground. In order to provide access to the valve operator, a key box is mounted on the valve to provide an opening for operating the valve actuator. The key box is generally supported on either wood blocks or on the ground surrounding the valve. These supports gradually deteriorate often resulting in the key box shifting with respect to the valve actuator, making it difficult, if not impossible, to engage the actuator to open or close the main. If this occurs, the key box must be dug out of the ground and reset on the ground supports. In an emergency situation, it is essential to close off the main in a minimum of time or a serious water hazard can develop.

SUMMARY OF THE INVENTION

The butterfly valve adaptor, according to the present invention, provides a positive support on the valve for the key box that will last as long as the valve. The adaptor can be quickly and easily mounted on the valve actuator to provide a positive support for the key box. This has been accomplished by mounting a stabilizing plate below the valve actuator to support a mounting plate above the valve actuator. The mounting plate is provided with a recess which encircles the valve actuator and a number of vertical guides to positively locate the base of the key box with respect to the valve actuator. With this arrangement, the adaptor can be positioned on the valve actuator and the key box can be set directly on the support plate.

THE DRAWINGS

DETAILED DESCRIPTION OF THE INVENTION

Figure 1:
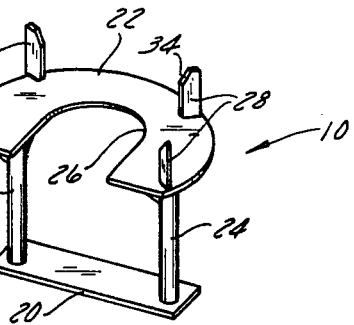
FIG. 1 is perspective view of the butterfly valve adaptor according to the invention.
Figure 2:
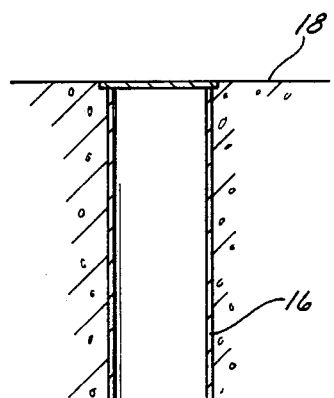
FIG. 2 is an elevation view partly in section showing the butterfly valve adaptor mounted on the valve actuator for the butterfly valve with the key box supported by the adaptor.
Figure 3:
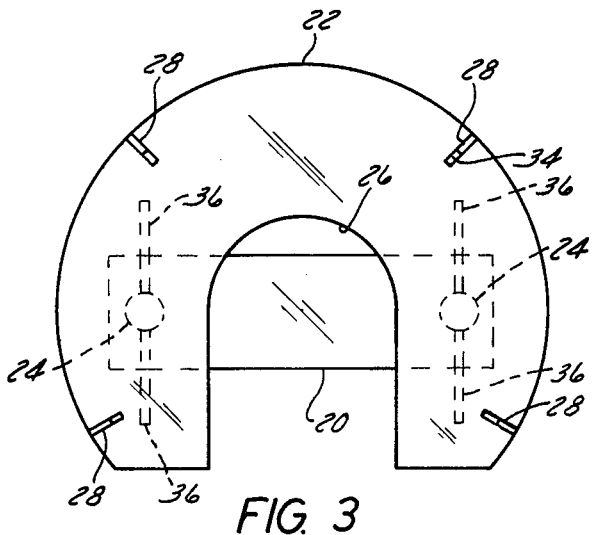
FIG. 3 is a top view of the adaptor.
Figure 5:
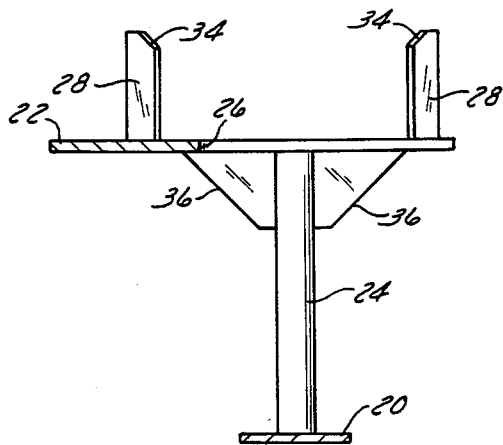
FIG. 5 is a side elevation view of the adaptor.
Figure 4:
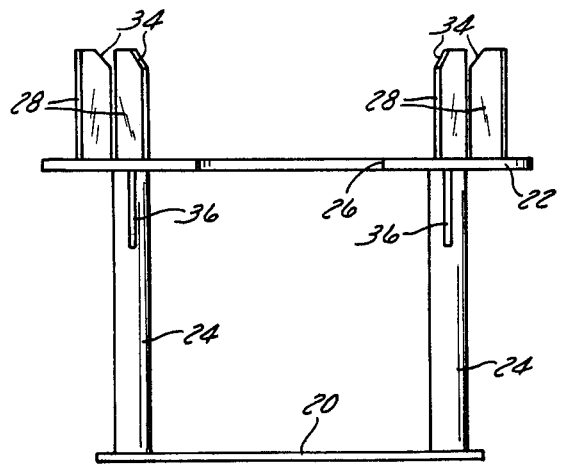
FIG. 4 is a front elevation view of the adaptor.

Referring to FIG. 2, the adaptor 10 is shown mounted on the valve actuator housing 12 for a butterfly valve 14. The valve 14 is operated by a valve actuator 15 mounted on the top of the housing 12. Access to the valve actuator 15 is provided by means of a key box 16 shown supported on the valve adaptor 10 with the upper end of the key box located at the surface of ground 18. The valve actuator is turned to open or close the valve by a key that is inserted through the center of the key box as generally understood in the art. Butterfly valves of the type contemplated herein are opened and closed by a rotation of a vane 17 mounted on a shaft 19 which extends into the housing 12. The shaft 19 is connected to a crosshead located within the housing 12. The crosshead is moved up and down on a threaded stem connected to the valve actuator 15 to rotate shaft 19 and open and close the vane.

The adaptor 10 as seen in the drawing is made of cast iron or steel and includes a base or stabilizing plate 20 and a mounting plate 22 supported on the base plate by means of a pair of posts 24. The posts are mounted in a generally parallel-spaced relation to straddle the sides of the actuator housing 12. The mounting plate 22 is stabilized on the housing by locating the base plate 20 below the housing 12. When the valve is back filled the plate 20 will be embedded in the ground preventing the mounting plate from tipping.

Means are provided on the top of the mounting plate to align the key box with respect to the valve actuator 15. Such means is in the form of a number of guides 28 mounted in an equally spaced vertical relation around the center of the mounting plate and at equally spaced radial distances from the center of the mounting plate. The radial distance of the guides being equal to the radius of the flange 30 located around the base 32 of the key box 16. Means are provided on the guides 28 to center to the base 32 of the key box into the center of the mounting plate 24. Such means is in the form of cam surfaces 34 located at the upper inner edges of the guides 28. Also, the mounting plate is provided with a U-shaped recess 26 so that the mounting plate can encircle the valve actuator 15.

Means are provided to rigidly secure the mounting plate 22 on the posts 24. Such means is in the form of a bracket or fillet 36 positioned between the upper end of each post 24 and the bottom of the mounting plate 22.

In operation, the adaptor 10 is mounted on the valve actuator housing 12 with the base plate located beneath the housing and the posts 24 straddling each side of the housing. The valve actuator 15 should be centered in the recess 26 so that the guides 28 are equally spaced from the actuator 15. The key box 16 is positioned on the mounting plate 22 to protect the valve actuator as the water main is back filled. This adaptor 10 will hold the key box in a fixed position with respect to the actuator 15 and assure access for the lift of the valve.

The embodiments of the invention in which an exclusive property or privilege is claimed, are defined as follows:

1. An adaptor for supporting a key box on the actuator housing of a butterfly valve in a position to provide access to the valve actuator for the valve, said adaptor comprising a base plate, a mounting plate having a U-shaped recess, a pair of posts for supporting said mounting plate in a spaced relation to a base plate and guide means on said mounting plate for aligning the key box with the valve actuator.

2. The adaptor according to claim 1 wherein said posts are mounted in a parallel relation on said base plate and spaced a distance apart sufficient to straddle said U-shaped recess.

3. The adaptor according to claim 1 or 2 wherein said guide means includes a number of vertical guides mounted on the top of said mounting plate at equally spaced intervals.

4. The adaptor according to claim 3 wherein said guides are spaced from the center of the mounting plate at equally spaced radial distances.

5. The adaptor according to claim 2 including means for stabilizing said mounting plate on said posts.

6. A key box adaptor for a water main butterfly valve having an exposed valve actuator located on the top of the valve actuator housing, said adaptor comprising a mounting plate having a U-shaped opening and a plurality of guides arranged on the top of the mounting plate at equally spaced intervals to center a key box therein and a stabilizing plate located below the mounting plate and a pair of posts for supporting said mounting plate on said stabilizing plate whereby the valve actuator can be substantially centered in the U-shaped opening in the mounting plate and the key box can be centered within the plurality of guides of said mounting plates.

* * * * *